United States Patent
Alverson et al.

(10) Patent No.: US 12,474,855 B2
(45) Date of Patent: Nov. 18, 2025

(54) DUPLICATING MEMORY CONTENT WITH CHIPSET ATTACHED MEMORY

(71) Applicant: Advanced Micro Devices, Inc., Santa Clara, CA (US)

(72) Inventors: William Robert Alverson, Del Valle, TX (US); Jerry Anton Ahrens, Sister Bay, WI (US); Anil Harwani, Austin, TX (US); Joshua Taylor Knight, Georgetown, TX (US); Grant Evan Ley, Eden, UT (US); Amitabh Mehra, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 27 days.

(21) Appl. No.: 18/187,900

(22) Filed: Mar. 22, 2023

(65) Prior Publication Data
US 2024/0319903 A1 Sep. 26, 2024

(51) Int. Cl.
  *G06F 3/00* (2006.01)
  *G06F 3/06* (2006.01)

(52) U.S. Cl.
  CPC .......... *G06F 3/065* (2013.01); *G06F 3/0619* (2013.01); *G06F 3/0631* (2013.01); *G06F 3/0683* (2013.01)

(58) Field of Classification Search
  None
  See application file for complete search history.

(56) References Cited

U.S. PATENT DOCUMENTS

| | | |
|---|---|---|
| 6,295,591 B1 | 9/2001 | Bealkowski et al. |
| 6,467,048 B1 | 10/2002 | Olarig et al. |
| 6,714,891 B2 | 3/2004 | Dendinger |
| 9,886,987 B1 | 2/2018 | Brahmadathan et al. |
| 10,691,570 B1 | 6/2020 | Lui et al. |
| 11,262,924 B2 | 3/2022 | Alverson et al. |
| 11,493,389 B2 | 11/2022 | Horng et al. |
| 11,720,266 B2 | 8/2023 | Alverson et al. |
| 11,740,944 B2 | 8/2023 | Mehra et al. |
| 12,399,846 B2 | 8/2025 | Ahrens et al. |

(Continued)

FOREIGN PATENT DOCUMENTS

| | | |
|---|---|---|
| CN | 114780473 A | 7/2022 |
| WO | 2024144870 A1 | 7/2024 |

OTHER PUBLICATIONS

U.S. Appl. No. 16/711,875, "Corrected Notice of Allowability", U.S. Appl. No. 16/711,875, Apr. 27, 2023, 2 pages.

(Continued)

*Primary Examiner* — Midys Rojas
(74) *Attorney, Agent, or Firm* — FIG. 1 Patents

(57) ABSTRACT

Duplicating memory content with chipset attached memory is described. In accordance with the described techniques, contents of a system memory are duplicated on a chipset attached memory over a chipset link. Memory requests are serviced using the contents of the system memory and the contents on the chipset attached memory. Servicing the memory requests includes servicing a first portion of a read request using the contents of the system memory and a second, remaining portion of the read request using the contents on the chipset attached memory. Servicing the memory requests further includes communicating a write request to the system memory and to the chipset attached memory.

20 Claims, 7 Drawing Sheets

(56) References Cited

U.S. PATENT DOCUMENTS

| | | |
|---|---|---|
| 2002/0010875 A1 | 1/2002 | Johnson et al. |
| 2002/0129186 A1 | 9/2002 | Emerson et al. |
| 2003/0074591 A1 | 4/2003 | Mcclendon et al. |
| 2003/0154428 A1 | 8/2003 | Pelner |
| 2003/0206050 A1 | 11/2003 | Huard et al. |
| 2003/0208650 A1 | 11/2003 | Depew et al. |
| 2003/0208654 A1 | 11/2003 | Krontz et al. |
| 2004/0133756 A1 | 7/2004 | Shaw et al. |
| 2004/0153723 A1* | 8/2004 | Depew ............... G06F 11/1666 714/6.11 |
| 2005/0283561 A1 | 12/2005 | Lee et al. |
| 2006/0136763 A1 | 6/2006 | Jorgenson et al. |
| 2006/0161375 A1 | 7/2006 | Duberstein et al. |
| 2008/0028236 A1 | 1/2008 | Capps et al. |
| 2008/0317086 A1 | 12/2008 | Santos et al. |
| 2009/0150660 A1 | 6/2009 | Yao et al. |
| 2010/0131221 A1 | 5/2010 | Chien |
| 2011/0131400 A1 | 6/2011 | Chiu et al. |
| 2013/0205130 A1 | 8/2013 | Hallowell et al. |
| 2013/0262728 A1 | 10/2013 | Wong |
| 2014/0032949 A1 | 1/2014 | Kim et al. |
| 2014/0159806 A1 | 6/2014 | Kim et al. |
| 2015/0063420 A1 | 3/2015 | Cho et al. |
| 2015/0242154 A1 | 8/2015 | Yang et al. |
| 2015/0378745 A1* | 12/2015 | He ..................... G06F 9/4401 711/137 |
| 2016/0011802 A1 | 1/2016 | Berke |
| 2016/0179643 A1 | 6/2016 | Sun et al. |
| 2017/0160956 A1 | 6/2017 | Chinnakkonda et al. |
| 2017/0262388 A1* | 9/2017 | Lin ..................... G06F 9/4411 |
| 2018/0088638 A1 | 3/2018 | Nguyen et al. |
| 2018/0107591 A1 | 4/2018 | Smith |
| 2018/0217005 A1 | 8/2018 | Kanodia |
| 2018/0253317 A1 | 9/2018 | Pan et al. |
| 2019/0310947 A1 | 10/2019 | Raisch et al. |
| 2019/0369683 A1 | 12/2019 | Vishnubhatla et al. |
| 2020/0065022 A1* | 2/2020 | Itagaki ..................... G06F 16/13 |
| 2021/0089461 A1 | 3/2021 | Choi et al. |
| 2021/0182121 A1 | 6/2021 | Mehra et al. |
| 2021/0255966 A1 | 8/2021 | Chen et al. |
| 2021/0326232 A1 | 10/2021 | Partiwala et al. |
| 2021/0349730 A1 | 11/2021 | Lee et al. |
| 2022/0155982 A1 | 5/2022 | Alverson et al. |
| 2022/0179756 A1 | 6/2022 | Fan et al. |
| 2022/0357855 A1* | 11/2022 | Narasingarayanapeta .................. G06F 3/0619 |
| 2023/0418590 A1 | 12/2023 | Gunyuzlu et al. |
| 2024/0211160 A1 | 6/2024 | Ahrens et al. |
| 2024/0211416 A1 | 6/2024 | Ahrens et al. |
| 2024/0319712 A1 | 9/2024 | Ahrens et al. |
| 2024/0330076 A1 | 10/2024 | Ahrens et al. |
| 2024/0330134 A1 | 10/2024 | Ahrens et al. |

OTHER PUBLICATIONS

U.S. Appl. No. 16/711,875 , "Final Office Action", U.S. Appl. No. 16/711,875, Sep. 2, 2021, 17 pages.

U.S. Appl. No. 16/711,875 , "Final Office Action", U.S. Appl. No. 16/711,875, Oct. 27, 2022, 17 pages.

U.S. Appl. No. 16/711,875 , "Non-Final Office Action", U.S. Appl. No. 16/711,875, Jan. 25, 2021, 16 pages.

U.S. Appl. No. 16/711,875 , "Non-Final Office Action", U.S. Appl. No. 16/711,875, Feb. 17, 2022, 16 pages.

U.S. Appl. No. 16/711,875 , "Notice of Allowance", U.S. Appl. No. 16/711,875, Apr. 14, 2023, 5 pages.

U.S. Appl. No. 17/591,924 , "Non-Final Office Action", U.S. Appl. No. 17/591,924, Oct. 20, 2022, 12 pages.

U.S. Appl. No. 17/591,924 , "Notice of Allowance", U.S. Appl. No. 17/591,924, Mar. 15, 2023, 5 pages.

Ahrens, Jerry Anton, et al., "US Application as Filed", U.S. Appl. No. 18/187,848, filed Mar. 22, 2023, 44 pages.

Ahrens, Jerry Anton, et al., "US Application as Filed", U.S. Appl. No. 18/190,664, filed Mar. 27, 2023, 37 pages.

Ahrens, Jerry Anton, et al., "US Application as Filed", U.S. Appl. No. 18/190,521, filed Mar. 27, 2023, 45 pages.

Ahrens, Jerry Anton, et al., "US Application as Filed", U.S. Appl. No. 18/146,929, filed Dec. 27, 2022, 42 pages.

Ahrens, Jerry Anton, et al., "US Application as Filed", U.S. Appl. No. 18/146,920, filed Dec. 27, 2022, 43 pages.

U.S. Appl. No. 18/146,920 , "Final Office Action", U.S. Appl. No. 18/146,920, Apr. 25, 2024, 15 pages.

U.S. Appl. No. 16/711,875 , "Corrected Notice of Allowability", U.S. Appl. No. 16/711,875, Jun. 8, 2023, 4 pages.

U.S. Appl. No. 18/146,920 , "Non-Final Office Action", U.S. Appl. No. 18/146,920, Jan. 26, 2024, 12 pages.

U.S. Appl. No. 18/146,929 , "Non-Final Office Action", U.S. Appl. No. 18/146,929, Mar. 28, 2024, 24 pages.

PCT/US2023/036376 , "International Seach Report and Written Opinion", PCT Application No. PCT/US2023/036376, Feb. 29, 2024, 8 pages.

"Corrected Notice of Allowability", U.S. Appl. No. 18/146,920, May 7, 2025, 2 pages.

"Final Office Action", U.S. Appl. No. 18/146,920, Nov. 22, 2024, 15 pages.

"Notice of Allowance", U.S. Appl. No. 18/146,920, Apr. 23, 2025, 9 pages.

"FInal Office Action", U.S. Appl. No. 18/146,929, Oct. 23, 2024, 26 pages.

"Final Office Action", U.S. Appl. No. 18/190,664, Feb. 26, 2025, 13 pages.

"Non-Final Office Action", U.S. Appl. No. 18/190,664, Nov. 13, 2024, 13 pages.

"Corrected Notice of Allowability", U.S. Appl. No. 18/146,920, Jun. 3, 2025, 2 pages.

"Corrected Notice of Allowability", U.S. Appl. No. 18/146,920, Jul. 29, 2025, 2 pages.

"Notice of Allowance", U.S. Appl. No. 18/146,929, Aug. 29, 2025, 8 pages.

"Non-Final Office Action", U.S. Appl. No. 18/187,848, Jun. 26, 2025, 20 pages.

"Non-Final Office Action", U.S. Appl. No. 18/190,664, Jun. 24, 2025, 14 pages.

* cited by examiner

DUPLICATING MEMORY CONTENT WITH CHIPSET ATTACHED MEMORY

BACKGROUND

Computer games and other applications are regularly advancing, resulting in larger programs, higher resolution graphics, new features, and so forth. To address these advances, computer hardware is also advancing to provide new types of memory having faster data rates, faster clock rates, additional redundancy, and so forth.

DETAILED DESCRIPTION

Overview

Figure 1:
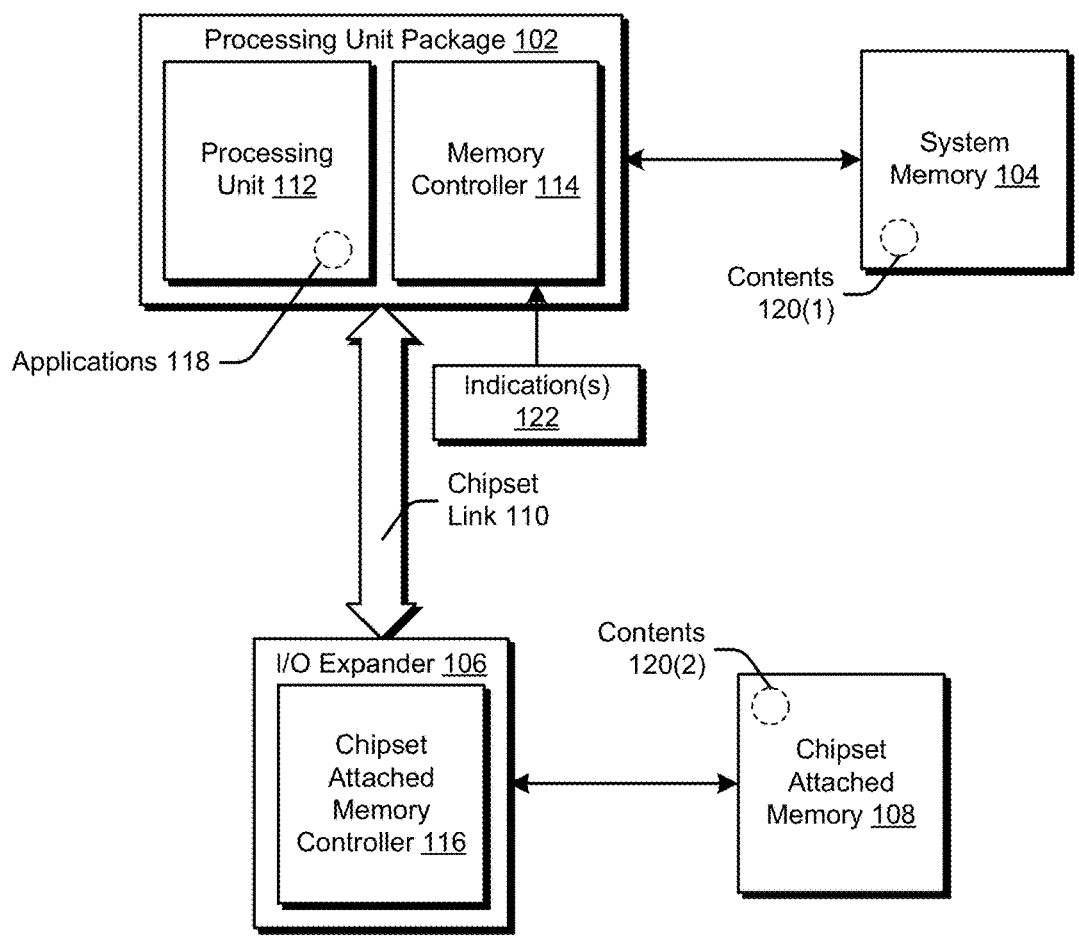
FIG. 1 is an illustration of a non-limiting example system that is operable to employ duplicating memory content with chipset attached memory.

Duplicating memory content with chipset attached memory is described. In accordance with the described techniques, a computing system uses duplicate contents of a system memory that are stored in a chipset attached memory to continue operating seamlessly while the system memory is unavailable, such as due to physical removal, resetting/retraining, or failure of the system memory. Moreover, the duplicate contents allow bandwidth intensive applications to access the system memory and the chipset attached memory in parallel, such as during a read process. For instance, different portions of a read request are accessed via the system memory and via the chipset attached memory to increase (e.g., double, depending on speeds of associated interfaces) read speeds and read throughput. Because the chipset attached memory is integrated directly with the chipset, fewer links and/or wires are used than with conventional mirrored memory approaches. This reduces costs and also decreases a number of locations that are susceptible to disconnection or degradation, for example, increasing a durability of the computing system. Furthermore, because of the direct chipset integration, optimizations are possible that are not available while adhering to protocol specifications, such as Peripheral Component Interconnect Express (PCIe) specifications. Examples of such optimizations include enhanced speed modes and streamlined high-efficiency protocol modifications, just to name a few.

In accordance with the described techniques, contents of the system memory are duplicated to the chipset attached memory via a chipset link, creating a mirrored storage solution. By way of example, the contents of the system memory are duplicated to the chipset attached memory in a manner similar to that used in a redundant array of inexpensive disks 1 (RAID 1) technique. However, rather than an array of disks, the described techniques utilize system and chipset memory pools, resulting in reduced usage of links and/or wires, such as mentioned above. Once the contents are duplicated in the chipset attached memory, various operations are performed using the contents from the system memory and/or the duplicate contents from the chipset attached memory. For example, a memory controller allocates a first portion of a read request (or a first read request) to the system memory and a second portion of the read request (or a second read request that is separate from the first read request but occurs in parallel) to the chipset attached memory in order to increase read throughput, such as mentioned above. As a result, memory read bandwidth is measurably increased (e.g., doubled, depending on the speeds of the associated interfaces) compared with servicing read requests using the system memory alone or the chipset memory alone. As another example, the memory controller sends a write request to both the system memory and the chipset attached memory in order to maintain the duplicate contents in real-time, as data are updated in the system memory, rather than duplicating the contents to the chipset attached memory after the data are written to the system memory. By doing so, the chipset attached memory stores an up-to-date duplication of the contents in the system memory, which reduces data loss in the event of, for instance, failure of the system memory. As another example, in at least one implementation, the chipset attached memory has enhanced resistance to power disturbances compared with the system memory, and so the chipset attached memory is able to write back in-use modified data that would otherwise be lost during a power loss event of the system memory.

Furthermore, portions (e.g., memory sections and/or modules) of the system memory and the chipset attached memory are dynamically reallocated (e.g., allocated and deallocated) during operation, such as by moving data from a first portion of the system memory and a corresponding first portion of the chipset attached memory to a second portion of the system memory and a corresponding second portion of the chipset attached memory. Reallocating the portions occurs, for instance, in response to an indication that the first portion is to be removed, replaced, or reset. Dynamically reallocating memory portions decreases and/or eliminates "down time" of the system, which reduces interruptions to various tasks performed by the system and improves a user experience.

As mentioned above, duplicating memory content with the chipset attached memory enables various operations to be performed using the duplicate contents of the chipset attached memory while the system memory is unavailable for various reasons. For example, a processing unit executes (and/or continues to seamlessly execute) one or more tasks of an operating system and/or an application using the duplicate contents from the chipset attached memory. Such tasks are performed using the duplicate contents, which are available transparently to the application in the chipset attached memory. When the system memory returns to a working state and is made available for servicing read and write requests, for example, a sync operation is performed to copy data present in the chipset attached memory that is not also present in the system memory to the system memory via the chipset link, such as data written to the chipset attached memory while the system memory was unavailable. In scenarios where the system memory is replaced or reset in a manner that is destructive to the contents, an entirety of the contents of the chipset attached memory is copied to the system memory over the chipset link.

Continuing to operate the system by performing memory-based tasks using the duplicate contents from the chipset attached memory while the main system memory is unavailable contrasts with conventional techniques. Rather than continuing to run an operating system or an application on a processing unit while system memory is unavailable, conventional techniques also power down attached processing units (and/or the system altogether). By continuing to operate using the chipset attached memory, the described techniques enable memory-based tasks to continue being performed (which keeps operating systems, applications, and so on running) even during system memory failure and replacement. As a result, "down time" of the system is reduced and/or eliminated, which reduces interruptions to various tasks (e.g., background tasks) and improves a user experience.

As another example, in at least one scenario, the system memory is unavailable for servicing additional memory-based tasks while operating at or near its maximum bandwidth (e.g., a maximum bandwidth of a connection between the system memory and the processing unit), such as when the system memory is utilized for various memory-intensive tasks related to, for example, running an operating system and/or one or more applications. In this scenario, the chipset attached memory performs the additional memory-based tasks, such as read/write requests, even while the system memory remains powered on and functional. In this way, operating tasks and memory-based tasks are divided between the system memory and the chipset attached memory according to their respective availability. As a result, a performance of the computing system is increased, which improves a user experience.

Moreover, in at least one implementation, the duplicate contents of the chipset attached memory enable memory corruption detection and correction. By way of example, data corruption is detected by comparing read data streams between the system memory and the chipset attached memory. When discrepancies are identified, such as bit value differences in the data streams, the discrepancy is corrected. For example, corrupted data in the system memory is overwritten with the corresponding data from the chipset attached memory. In one or more implementations, the chipset attached memory has increased memory error correction capabilities compared with the system memory, such as error code correction (ECC). In this way, robust live-data hardening is achieved.

In some aspects, the techniques described herein relate to an apparatus including a system memory, a chipset attached memory, and a memory controller to obtain contents of the system memory, duplicate the contents of the system memory on a chipset attached memory over a chipset link, and service memory requests using the contents of the system memory and the contents on the chipset attached memory.

In some aspects, the techniques described herein relate to an apparatus, wherein to service the memory requests using the contents of the system memory and the contents on the chipset attached memory, the memory controller is further configured to service a first portion of a read request using the contents of the system memory, and service a second, remaining portion of the read request using the contents of the chipset attached memory.

In some aspects, the techniques described herein relate to an apparatus, wherein to service the memory requests using the contents of the system memory and the contents on the chipset attached memory, the memory controller is further configured to communicate a write request to the system memory and to the chipset attached memory.

In some aspects, the techniques described herein relate to an apparatus, wherein the memory controller duplicates the contents of the system memory on the chipset attached memory over the chipset link in response to receiving a request for a mirrored memory configuration.

In some aspects, the techniques described herein relate to an apparatus, wherein the memory controller is further configured to dynamically allocate and deallocate portions of the system memory and the chipset attached memory for storing the contents.

In some aspects, the techniques described herein relate to an apparatus, wherein the memory controller is configured to dynamically allocate and deallocate the portions of the system memory and the chipset attached memory for storing the contents in response to receiving an indication of at least one of a physical adjustment to the system memory or the chipset attached memory, a retraining of the system memory or the chipset attached memory, and a resetting of the system memory or the chipset attached memory.

In some aspects, the techniques described herein relate to an apparatus, further including a processing unit, and wherein the memory requests are received by the memory controller from one or more applications executing on the processing unit.

In some aspects, the techniques described herein relate to an apparatus, wherein the processing unit is configured to execute one or more tasks of an operating system or the one or more applications using the contents on the chipset attached memory while the system memory is unavailable.

In some aspects, the techniques described herein relate to an apparatus, wherein the memory controller is further configured to identify corrupted data in the system memory based on discrepancies between a first read data stream from a memory section of the system memory and a second read data stream from a corresponding memory section of the chipset attached memory.

In some aspects, the techniques described herein relate to an apparatus, wherein the memory controller is further configured to correct the corrupted data by writing data from the corresponding memory section of the chipset attached memory to the memory section of the system memory.

In some aspects, the techniques described herein relate to a method including obtaining contents of a system memory, writing duplicate contents of the system memory to a chipset attached memory over a chipset link, servicing read requests, received from one or more applications, using the contents of the system memory and the duplicate contents of the chipset attached memory in parallel, and storing write requests to the contents of the system memory and to the duplicate contents of the chipset attached memory.

In some aspects, the techniques described herein relate to a method, wherein the writing the duplicate contents of the system memory to the chipset attached memory over the chipset link is responsive to a request for a mirrored memory configuration.

In some aspects, the techniques described herein relate to a method, further including dynamically allocating and deallocating portions of the system memory and the chipset attached memory for storing the contents and the duplicate contents, respectively.

In some aspects, the techniques described herein relate to a method, wherein the dynamically allocating and deallocating the portions of the system memory and the chipset attached memory is in response to receiving an indication of at least one of a physical adjustment, a resetting, and a retraining of the system memory or the chipset attached memory.

In some aspects, the techniques described herein relate to a method, wherein the servicing the read requests, received from the one or more applications, using the contents of the system memory and the duplicate contents of the chipset attached memory in parallel includes servicing a first portion of the read requests using the contents of the system memory, and while servicing the first portion of the read requests using the contents of the system memory, servicing a second, remaining portion of the read requests using the duplicate contents of the chipset attached memory.

In some aspects, the techniques described herein relate to a method, further including executing, via a processing unit, one or more tasks of an operating system or an application using the duplicate contents of the chipset attached memory in response to an indication that the system memory is unavailable.

In some aspects, the techniques described herein relate to a method, further including performing a sync operation to copy data included in the duplicate contents of the chipset attached memory that is not present in the contents of the system memory in response to the system memory becoming available, and executing, via the processing unit, the one or more tasks of the operating system or the application using the contents of the system memory after performing the sync operation.

In some aspects, the techniques described herein relate to a system including a system memory to store contents, a chipset attached memory to store the contents of the system memory in a mirrored manner, and a processing unit to execute one or more tasks of an operating system using the contents of the system memory in response to a first indication that the system memory is available for servicing memory requests, and continue executing the one or more tasks using the contents of the chipset attached memory in response to a second indication that the system memory is not available for servicing the memory requests.

In some aspects, the techniques described herein relate to a system, further including a chipset link, and wherein the chipset attached memory is separate from the system memory and communicates with the processing unit via the chipset link.

In some aspects, the techniques described herein relate to a system, further including a memory controller configured to in response to the first indication that the system memory is available for servicing the memory requests communicate a first portion of a read request to the system memory and a second portion of the read request to the chipset attached memory over a chipset link, and communicate a write request to the system memory and to the chipset attached memory over the chipset link, and in response to the second indication that the system memory is not available for servicing the memory requests communicate the first portion and the second portion of the read request to the chipset attached memory over the chipset link, and communicate the write request to the chipset attached memory over the chipset link.

FIG. 1 is an illustration of a non-limiting example system 100 that is operable to employ duplicating memory content with chipset attached memory. The system 100 includes a processing unit package 102, a system memory 104, an I/O expander 106, a chipset attached memory 108, and a chipset link 110. The processing unit package 102, the system memory 104, the I/O expander 106, the chipset attached memory 108, and the chipset link 110 are installed on or are part of, for example, a motherboard or other printed circuit board. In one or more implementations, the I/O expander 106 (including the chipset attached memory controller 116), the chipset link 110, one or more memory channels between the processing unit package 102 and the system memory 104, and one or more memory channels between the I/O expander 106 and the chipset attached memory 108 are also referred to as a chipset of a motherboard or other printed circuit board.

The processing unit package 102 includes a processing unit 112 and a memory controller 114. The processing unit 112 is any of various processing units, such as a central processing unit (CPU), a graphics processing unit (GPU), an accelerated processing unit (APU), a parallel accelerated processor, a digital signal processor, an artificial intelligence (AI) or machine learning accelerator, and so forth. Although a single processing unit 112 is illustrated in the system 100, the processing unit package 102 optionally includes any number of processing units of the same or different types.

The system memory 104 is any of a variety of types of physical random-access memory (RAM). Examples of the system memory 104 include dynamic random-access memory (DRAM), phase-change memory (PCM), memristors, static random-access memory (SRAM), and so forth. The system memory 104 is coupled or attached to the processing unit package 102 via one or more memory channels. The system memory 104 is packaged or configured in any of a variety of different manners. Examples of such packaging or configuring include a dual in-line memory module (DIMM), a small outline DIMM (SO-DIMM), a registered DIMM (RDIMM), a non-volatile DIMM (NVDIMM), a ball grid array (BGA) memory permanently attached to (e.g., soldered to) the motherboard (or other printed circuit board), and so forth.

Examples of types of DIMMs include, but are not limited to, synchronous dynamic random-access memory (SDRAM), double data rate (DDR) SDRAM, double data rate 2 (DDR2) SDRAM, double data rate 3 (DDR3) SDRAM, double data rate 4 (DDR4) SDRAM, and double data rate 5 (DDR5) SDRAM. In at least one variation, the system memory 104 is configured as or includes a SO-DIMM or an RDIMM according to one of the above-mentioned standards, e.g., DDR, DDR2, DDR3, DDR4, and DDR5.

Further examples of memory configurations include low-power double data rate (LPDDR), also known as LPDDR SDRAM, which is a type of synchronous dynamic random-access memory. In variations, LPDDR consumes less power than other types of memory and/or has a form factor suitable for mobile computers and devices, such as mobile phones. Examples of LPDDR include, but are not limited to, low-power double data rate 2 (LPDDR2), low-power double data rate 3 (LPDDR3), low-power double data rate 4 (LPDDR4), and low-power double data rate 5 (LPDDR5). It is to be appreciated that the system memory 104 is configurable in a variety of ways without departing from the spirit or scope of the described techniques.

The memory controller 114 manages access to the system memory 104, such as by sending read and write requests to the system memory 104 and receiving responses from the system memory 104. In one or more implementations, the system memory 104 is physical memory managed by an operating system running on the processing unit 112 (e.g., a CPU), such as by allocating portions of the system memory 104 to applications 118 running on the processing unit 112, managing virtual memory spaces and memory pages for applications running on the processing unit 112, and so forth.

The processing unit package 102 optionally includes one or more additional controllers to link to additional devices, such as a Peripheral Component Interconnect Express (PCIe) controller, a Serial Advanced Technology Attachment (SATA) controller, a Universal Serial Bus (USB) controller, a Serial Peripheral Interface (SPI) controller, a Low Pin Count (LPC) controller, and so forth. Additionally or alternatively, one or more of these additional controllers is implemented separate from the processing unit package 102, such as in a chip (e.g., an integrated circuit optionally referred to as a northbridge) that is part of the chipset of a motherboard or other printed circuit board.

The processing unit package 102 communicates with the I/O expander 106 via the chipset link 110. The chipset link 110 is any of a variety of communication links, such as a high-speed bus. In one example, the chipset link 110 is one or more PCIe lanes.

The I/O expander 106 includes a chipset attached memory controller 116. The I/O expander 106 optionally includes or is coupled to one or more additional controllers to link to other devices, such as a PCIe controller, a SATA controller, a USB controller, an SPI controller, an LPC controller, and so forth. In one or more implementations, the I/O expander 106 is referred to as a southbridge.

The chipset attached memory controller 116 manages access to the chipset attached memory 108, such as by sending read and write requests to the chipset attached memory 108 and receiving responses from the chipset attached memory 108. The chipset attached memory 108 is referred to as "chipset attached" due to the chipset attached memory 108 being attached to the I/O expander 106 rather than the processing unit package 102 directly, and due to the chipset attached memory 108 being controlled by a memory controller of the I/O expander 106 rather than a memory controller of the processing unit package 102. The chipset attached memory 108 is coupled or attached to the I/O expander 106 via one or more memory channels.

The chipset attached memory 108 is physical memory managed by an application or program other than an operating system running on the processing unit 112. The chipset attached memory 108 is separate from the system memory 104, allowing the chipset attached memory to be used in various manners, such as to speed up access to frequently used data and/or for mirrored storage that is utilized for advanced memory corruption detection and correction, without reducing the amount of system memory 104 available to an operating system running on the processing unit 112. Due to the direct chipset integration of the chipset attached memory 108, in at least one implementation, the chipset link 110 enables enhanced speed modes and/or streamlined high-efficiency protocol modifications to be enabled for communications between the processing unit package 102 and the chipset attached memory 108 that are not possible while adhering to protocol specifications (e.g., PCIe protocols).

The chipset attached memory 108 is any of a variety of types of physical memory. Examples of chipset attached memory 108 include random-access memory (RAM), such as DRAM, PCM, memristors, SRAM, and so forth. The chipset attached memory 108 is volatile memory or non-volatile memory (e.g., NVRAM). The chipset attached memory 108 is packaged or configured in any of a variety of different manners. Examples of such packaging or configuring include a DIMM, a SO-DIMM, an RDIMM, an NVDIMM, a BGA, a 3-dimensional (3D) stacked memory, on-package memory (e.g., memory included in the I/O expander 106), memory permanently attached to (e.g., soldered to) the motherboard, and so forth.

As noted above, examples of types of DIMMs include, but are not limited to, SDRAM, DDR SDRAM, DDR2 SDRAM, DDR3 SDRAM, DDR4 SDRAM, and DDR5 SDRAM. In at least one variation, the chipset attached memory 108 is configured as or includes a SO-DIMM or an RDIMM according to one of the above-mentioned standards, e.g., DDR, DDR2, DDR3, DDR4, and DDR5. Further examples of chipset attached memory configurations include LPDDR, such as LPDDR2, LPDDR3, LPDDR4, and LPDDR5. It is to be appreciated that the chipset attached memory 108 is configurable in a variety of ways without departing from the spirit or scope of the described techniques.

In accordance with the described techniques, the system 100 uses the chipset attached memory 108 to store data in a mirrored manner, represented in FIG. 1 by contents 120(1) in the system memory 104 and contents 120(2) in the chipset attached memory 108. By way of example, the contents 120(2) is a duplicate of the contents 120(1). In one or more scenarios, the contents 120(2) is substantially a duplicate (e.g., a near duplicate) of the contents 120(1). In at least one implementation, the contents 120(1) of the system memory 104 are duplicated on the chipset attached memory 108 using a redundant array of inexpensive disks 1 (RAID 1) type of technique. For example, rather than a disk array, the chipset attached memory 108 provides memory pools for redundancy. Memory redundancy between the system memory 104 and the chipset attached memory 108 enables memory corruption detection and correction, such as by comparing read data streams of the contents 120(1) from the system memory 104 with corresponding read data streams of the contents 120(2) from the chipset attached memory 108. In one or more variations, additionally or alternatively, the chipset attached memory 108 is or includes error code correction (ECC) memory that is used to detect and correct bit-level data corruption in the system memory 104.

Additionally or alternatively, duplicating the memory contents enables the applications 118 to leverage increased read speeds by accessing the contents 120(1) of the system memory 104 and the contents 120(2) of the chipset attached memory 108 in parallel. For example, different sections of the system memory 104 and the chipset attached memory 108 are read at the same time in order to service a first portion of memory requests via the system memory 104 and a second portion of the memory requests via the chipset attached memory 108, thus increasing a read throughput and an overall performance of the system 100.

In at least one implementation, the system 100 dynamically allocates and deallocates regions of memory space within the system memory 104 and the chipset attached memory 108 to allow for either memory location to be powered down, reset, retrained, or otherwise unavailable at a given time, including while physical modules are added/removed and/or different settings are applied, transparently and seamlessly while the operating system remains live. In this way, the memory redundancy enables the system 100 to operate while either the system memory 104 or the chipset attached memory 108 is "offline" or otherwise "unavailable."

By way of example, the system 100 uses the chipset attached memory 108 to continue running an operating system while the system memory 104 is being physically adjusted, retrained, or tested. Examples of such physical adjustments include, but are not limited to, removing the system memory 104 (or one or more components of the system memory 104, such as a DIMM, a SO-DIMM, or an RDIMM), swapping the system memory 104 (or components of the system memory 104, such as DIMMs, SO-DIMMs, or RDIMMs), replacing the system memory 104 (or one or more components of the system memory 104, such as a DIMM, a SO-DIMM, or an RDIMM), and adding to the system memory 104 (e.g., adding one or more components, such as a DIMM, SO-DIMM, or RDIMM). Examples of retraining include running one or more algorithms for enabling data to be reliably written to and/or read from at least a portion of system memory 104 using a variety of memory settings (e.g., overclocking and non-overclocking settings). Examples of those algorithms include, but are not limited to a write leveling algorithm, a multi-purpose register (MPR) pattern write algorithm, a read centering algorithm, and/or a write centering algorithm. Examples of memory testing include debugging and logging applications and/or tools. Similarly, the system 100 continues operating with the system memory 104 while the chipset attached memory 108 is removed, physically adjusted, retrained, tested, or otherwise unavailable.

In at least one implementation, the system memory 104 is "unavailable" while it remains powered on and operational, such as due to an interface between the system memory 104 and the processing unit package 102 (e.g., the one or more memory channels) not having enough bandwidth to service a series of read/write requests. Rather than waiting for bandwidth to become available to access the system memory 104, in this scenario, the series of read/write requests is serviced by the chipset attached memory 108 via the chipset link 110. Doing so enables the read/write requests to be completed more quickly for increased processing efficiency compared with waiting for bandwidth to become available at the system memory 104.

In at least one variation, additionally or alternatively, the chipset attached memory 108 has increased resistance to power disturbances compared with the system memory 104, enabling the system 100 to save in-use, modified data to the chipset attached memory 108 when the system memory 104 is inadvertently powered down. For example, the chipset attached memory 108 is or includes NVRAM. The saved data is copied back to the system memory 104 upon rebooting of the system memory 104, such as via a sync operation. As a result, increased memory robustness is achieved.

In one or more implementations, indication(s) 122 (e.g., one or more indications 122) are received regarding a status of the system memory 104 and/or the chipset attached memory 108. Although FIG. 1 depicts the one or more indications 122 being received by the memory controller 114, it is to be appreciated that the indication(s) 122 are received by other components in addition to or as an alternative to the memory controller 114, such as the chipset attached memory controller 116 and/or the processing unit 112. Examples of the indication(s) 122 include, but are not limited to, an indication that one of the memory locations (e.g., the system memory 104 or the chipset attached memory 108) is offline and unavailable, an indication that one of the memory locations is going to be offline and unavailable imminently, an indication that memory corruption has been detected (e.g., in the system memory 104), and an indication that an offline memory location has come back online and is available for accessing the contents stored therein.

In one or more implementations, at least one of the indication(s) 122 is received from an operating system and/or an application, e.g., executing on the processing unit 112 or portions of which execute on the processing unit 112. In at least one variation, the indication 122 is received from another component of the system 100 or from a different component (not shown) coupled to the system 100. Additionally, in one or more scenarios, at least one of the indication(s) 122 is received based on user input or based on a different trigger. By way of example, a user provides an input via a user interface of a system or memory management application of the applications 118, and the input indicates that the user intends to physically adjust the system memory 104. This enables the system 100 to transition to a state where a person can physically adjust the system memory 104 without endangering himself or herself and without damaging components of the system 100. If power is not cut to the system memory 104, for instance, a person attempting to physically adjust the system memory 104 risks being electrically shocked, which can cause a variety of adverse outcomes.

By way of example, while the system memory 104 is offline, the processing unit 112 executes (and/or continues to execute) one or more tasks of an operating system and/or the applications 118 using the contents 120(2) from the chipset attached memory 108 rather than using the contents 120(1) from the system memory 104. Continuing to operate by performing memory-based tasks while the system memory 104 is being physically adjusted, reset, retrained, or is otherwise offline contrasts with conventional techniques. Rather than continuing to run an operating system or an application on a processing unit while system memory is offline, conventional techniques also power down the processing unit (and/or the system 100 altogether). By continuing to operate using the chipset attached memory 108, the described techniques enable memory-based tasks to continue being performed (which keeps the operating system, applications 118, and so forth running) during physical adjustments to the system memory 104, resetting/retraining of the system memory 104, or other causes of power loss, data corruption, or unavailability (e.g., busyness) of the system memory 104. As a result, "down time" of the system 100 is reduced and/or eliminated, which reduces interruptions to various tasks (e.g., background tasks) and improves a user experience. Although physical adjustments to the system memory 104 are described above, it is to be appreciated that the system 100 operates similarly using the chipset attached memory 108 while the system memory 104 is reset, retrained, or otherwise unavailable for servicing additional memory requests.

After the system memory 104 comes back online (e.g., after the physical adjustments are made), in some instances, at least a portion of the contents 120(2) are transferred from the chipset attached memory 108 to the system memory 104 via the chipset link 110. By way of example, modified portions of the contents 120(2), such as from write requests executed while the system memory 104 was offline, are written back to the system memory 104 in a sync operation so that the contents 120(1) of the system memory 104 match the contents 120(2) of the chipset attached memory 108. In at least one variation, an entirety of the contents 120(2) is transferred to the system memory 104, such as when the system memory 104 is reset or replaced. Similarly, when the system memory 104 performs operations that update the contents 120(1), the sync operation includes transferring these updated contents 120(1) to the chipset attached memory 108, e.g., via the RAID 1-like technique, over the chipset link 110 in order to update the contents 120(2) to reflect these changes.

In one or more implementations, prior to transferring at least the portion of the contents 120(2) to the system memory 104 via the sync operation, the new physical configuration of the system memory (e.g., with new DIMMs) is trained and brought back online and then the contents 120(2) of the chipset attached memory 108 are transferred back to the system memory 104 via the sync operation. In at least one implementation, the sync operation includes allocating and deallocating portions of the chipset attached memory 108 based on a new configuration of the system memory 104, such as by moving file storage locations within the chipset attached memory 108, so that the chipset attached memory 108 mirrors the system memory 104. After the sync operation is completed, various operations are performed, at least in part, using the contents 120(1) from the system memory 104 as adjusted rather than performing the operations entirely using the contents 120(2) from the chipset attached memory 108. For example, the processing unit 112 executes (and/or resumes executing) one or more tasks of an operating system and/or the applications 118 using the contents 120(1) from the system memory 104 and/or the contents 120(2) of the chipset attached memory 108. The contents 120(1) of the system memory 104 and the contents 120(2) of the chipset attached memory 108 are accessible in parallel for increased read speeds, such as described above.

Moreover, in at least one implementation, operating tasks and memory requests are divided between the system memory 104 and the chipset attached memory 108 based on, for example, characteristics of the respective physical memories. Non-limiting examples of such characteristics include read speeds, write speeds, bandwidths (e.g., a maximum bandwidth and/or a currently available bandwidth), and storage capacities. By way of example, the memory controller 114 dynamically adjusts the division of the operating tasks and the memory requests between the system memory 104 and the chipset attached memory 108 based on their current operating statuses. For instance, the memory controller 114 communicates a larger portion of read requests to the system memory 104 when the system memory 104 has a higher available bandwidth than the chipset attached memory 108 and to the chipset attached memory 108 when the chipset attached memory 108 has a higher available bandwidth than the system memory 104. As another non-limiting example, additionally or alternatively, the memory controller 114 communicates the larger portion of the read requests to the physical memory (the system memory 104 or the chipset attached memory 108) that has a faster read speed. It is to be appreciated that in at least one variation, the memory controller 114 divides the operating tasks and the memory requests between the system memory 104 and the chipset attached memory 108 in other ways without departing from the spirit or scope of the described techniques.

Thus, in one or more scenarios, the processing unit 112 operates using the contents 120(1) from the system memory 104 and/or the contents 120(2) from the chipset attached memory 108 without disruption, even while one of the memory locations (e.g., the system memory 104 or the chipset attached memory 108) goes offline, fails, or does not have available bandwidth for servicing additional memory requests. Moreover, by accessing the contents 120(1) of the system memory 104 and the contents 120(2) of the chipset attached memory 108 in parallel, increased memory throughput is achieved, such as twice the memory throughput when the system memory 104 and the chipset attached memory 108 are deployed with symmetrical bandwidth capabilities compared to accessing the system memory 104 alone. Additionally or alternatively, implementations that include compression strategies enable the bandwidth to be further increased.

The system 100 is implementable in any of a variety of different types of computing devices. For example, the system 100 is implementable in a device or apparatus such as a personal computer (e.g., a desktop or tower computer), a smartphone or other wireless phone, a tablet or phablet computer, a notebook computer, a laptop computer, a wearable device (e.g., a smartwatch, an augmented reality headset or device, a virtual reality headset or device), an entertainment device (e.g., a gaming console, a portable gaming device, a streaming media player, a digital video recorder, a music or other audio playback device, a television, a set-top box), an Internet of Things (IoT) device, an automotive computer, and so forth.

Figure 2:
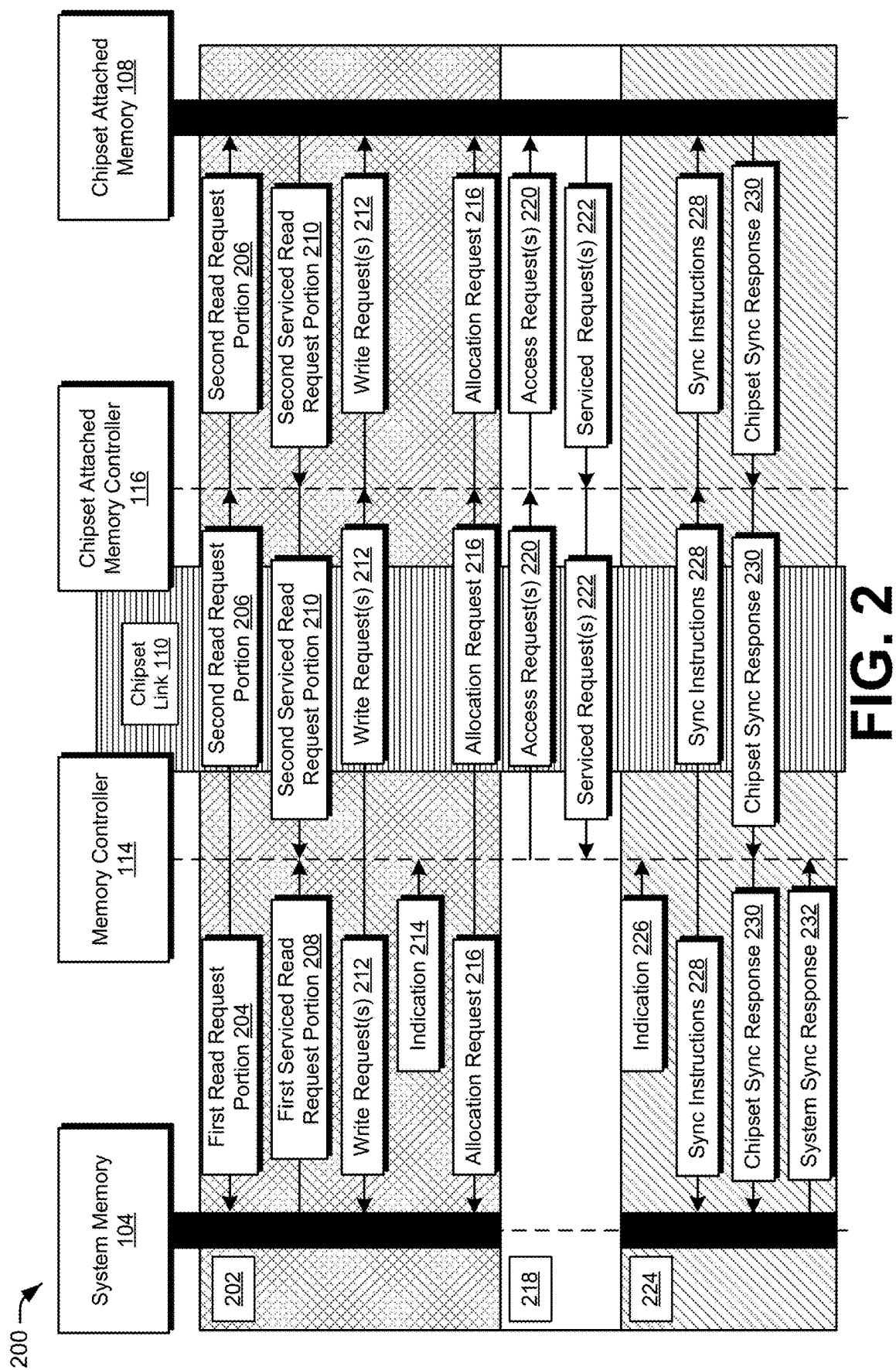
FIG. 2 depicts a non-limiting example in which duplicated memory content in chipset attached memory is utilized for device operation.

FIG. 2 depicts a non-limiting example 200 in which duplicated memory content in chipset attached memory is utilized for device operation. The example 200 includes the system memory 104, the memory controller 114, the chipset link 110, the chipset attached memory controller 116, and the chipset attached memory 108.

The example 200 includes a variety of example communications and operations between the system memory 104, the memory controller 114, the chipset link 110, the chipset attached memory controller 116, and the chipset attached memory 108 over time. In this example 200, the communications and operations are positioned vertically based on time, such that communications and operations closer to a top of the example occur prior to communications or operations farther from the top of the example. It follows also that communications or operations closer to a bottom of the example occur subsequent to communications or operations farther from the bottom. The example 200 also depicts various phases and/or states of the system 100 or portions of the system 100. These phases and/or states are also positioned in the example 200 vertically based on time, such that phases or states closer to a top of the example occur prior to phases, states, or communications farther from the top.

In the illustrated example 200, operability of the system memory 104 is indicated by a black bar arranged perpendicularly to the system memory 104 block, whereas non-operability or a powered-down state is indicated by an absence of the black bar perpendicular to the system memory 104 block on the dashed line extending from the system memory 104 block. Similarly, operability of the chipset attached memory 108 is indicated by the black bar arranged perpendicularly to the chipset attached memory 108 block that is disposed on the dashed line extending from the chipset attached memory 108 block.

Here, the illustrated example 200 depicts a first phase 202 of operation of a device (and/or the system 100) where the system memory 104 and the chipset attached memory 108 are both online (e.g., powered and accessible). The system memory 104 receives a first read request portion 204 from the memory controller 114, and the chipset attached memory 108 receives a second read request portion 206, which is communicated from the memory controller 114 over the chipset link 110 to the chipset attached memory controller 116 and then to the chipset attached memory 108. The first read request portion 204 includes a first portion of read requests initiated by the processing unit 112, e.g., for executing one or more tasks of an operating system and/or applications 118, and the second read request portion 206 includes a second, remaining portion of the read requests initiated by the processing unit 112. The processing unit 112 is not shown in FIG. 2 for illustrative clarity. By way of example, the memory controller 114 distributes the read requests between the system memory 104 and the chipset attached memory 108 based on a bandwidth of the respective memory locations.

The illustrated example 200 also depicts the memory controller 114 receiving a first serviced read request portion 208 from the system memory 104 and a second serviced read request portion 210 from the chipset attached memory 108 via the chipset attached memory controller 116 over the chipset link 110. The respective serviced read request includes or otherwise indicates data of one or more memory addresses associated with the read request. For instance, the first serviced read request portion 208 includes data of one or more memory addresses associated with each read request of the first read request portion 204, as serviced using the contents 120(1) of the system memory 104. Similarly, the second serviced read request portion 210 includes data of one or more memory addresses associated with each read request of the second read request portion 206, as serviced using the contents 120(2) of the chipset attached memory 108 at the same time the first serviced read request portion 208 is serviced using the contents 120(1) of the system memory 104.

In the illustrated example 200, the first phase 202 of operation further includes one or more write requests 212, which are depicted being provided from the memory controller 114 to the system memory 104 and to the chipset attached memory controller 116 via the chipset link 110. The chipset attached memory controller 116 further communicates the one or more write requests 212 to the chipset attached memory 108. For example, the one or more write requests 212 are initiated by the processing unit 112, e.g., for executing one or more tasks of the operating system and/or the applications 118. The one or more write requests 212 involve updating both the system memory 104 and the chipset attached memory 108 at one or more memory addresses associated with respective write requests to maintain one or more indicated values. Unlike the read requests, which are distributed (e.g., divided) between the system memory 104 and the chipset attached memory 108, the system memory 104 and the chipset attached memory 108 both receive the same one or more write requests 212 (e.g., all of the one or more write requests 212) so that the chipset attached memory 108 mirrors the system memory 104. It is to be appreciated that, in various scenarios, the one or more write requests 212 are interleaved with transmission of the read requests (e.g., the first read request portion 204 and the second read request portion 206) and indications of serviced read requests (e.g., from the first serviced read request portion 208 and the second serviced read request portion 210).

At a point in time during the first phase 202 of operation, the memory controller 114 is depicted receiving an indication 214 (e.g., one of the indication(s) 122 from FIG. 1). In at least one variation, the memory controller 114 receives the indication 214 in response to the system memory 104 going offline rather than before the system memory 104 goes offline. As noted above, in one or more implementations, the indication 214 is received based on user input that is, for example, received via a user interface and indicates that the system memory 104 is to be imminently powered down, reset, and/or retrained. In one or more variations, the indication 214 is received from the processing unit 112 or another component of the device (or system 100) without being triggered by user input. By way of example, the indication 214 informs the memory controller 114 that the system memory 104 will be unavailable for servicing memory requests, such as while adjustments (e.g., physical adjustments and/or memory setting adjustments) are made to the system memory 104.

In some scenarios, the indication 214 further includes instructions for allocating and/or deallocating regions of memory space within the system memory 104 and the chipset attached memory 108 in preparation for these adjustments. Here, the illustrated example 200 depicts the memory controller 114 communicating an allocation request 216 to the system memory 104 and to the chipset attached memory controller 116 via the chipset link 110. The chipset attached memory controller 116 further communicates the allocation request 216 to the chipset attached memory 108. By way of example, the allocation request 216 includes instructions to move data (e.g., at least a portion of the contents 120(1)) from a first memory region (e.g., module, section, or portion) of the system memory 104 to a second memory region of the system memory 104, such as when the first memory region is to be removed or replaced while the system memory 104 is offline. Similarly, the allocation request 216 includes instructions to move data (e.g., at least a portion of the contents 120(2)) from a first memory region (e.g., module, section, or portion) of the chipset attached memory 108 to a second memory region of the chipset attached memory 108 to maintain a mirrored storage configuration with the system memory 104, at least in one implementation.

The device transitions to a second phase 218 of operation in response to the system memory 104 going offline. During the second phase 218 of operation, the device (and/or the system 100) operates using the contents 120(2) from the chipset attached memory 108, e.g., rather than using the system memory 104. Thus, the chipset attached memory 108 services read/write requests (e.g., all of the read/write requests), including read requests that would otherwise be serviced by the system memory 104 during the first phase 202 of operation (e.g., the first read request portion 204). In other words, during the second phase 218, the chipset attached memory 108 services one or more access requests 220, resulting in corresponding one or more serviced requests 222. In this example 200, the access request(s) 220 include read and/or write requests and are depicted being communicated from the memory controller 114 over the chipset link 110 to the chipset attached memory controller 116 and then to the chipset attached memory 108. By way of example, the access request(s) 220 are initiated by the processing unit 112, e.g., for executing one or more tasks of the operating system and/or the applications 118. Further, the serviced request(s) 222 are depicted being provided from the chipset attached memory 108 to the chipset attached memory controller 116 and over the chipset link 110 to the memory controller 114.

The device transitions to a third phase 224 of operation in response to the system memory 104 coming back online. Further, the memory controller 114 is depicted receiving an indication 226 (e.g., one of the indication(s) 122 from FIG. 1) in response to the system memory 104 coming back online. In one or more implementations, the indication 226 is received based on user input, e.g., received via a user interface and indicating that adjustments to the system memory 104 have been completed. In at least one variation, the indication 226 is received from the processing unit 112 or another component of the system 100 without being triggered by user input. The indication 226 informs the memory controller 114 that the system memory 104 is accessible. Although FIG. 2 depicts the memory controller 114 receiving the indication 226 after the system memory 104 comes back online, it is to be appreciated that in at least one variation, the memory controller 114 receives the indication 226 prior to the system memory 104 coming back online, such as in response to a reboot of the system memory 104 being commanded.

In response to receiving the indication 226, in the illustrated example 200, the memory controller 114 transmits sync instructions 228 to the system memory 104 and to the chipset attached memory controller 116. For example, the chipset attached memory controller 116 receives sync instructions 228 from the memory controller 114 via the chipset link 110 and further transmits the sync instructions 228 to the chipset attached memory 108. Broadly, the sync instructions 228 are used to sync the system memory 104 with the chipset attached memory 108 so that memory redundancy is achieved in the device (and/or the system 100). In at least one implementation, the sync instructions 228 include instructions for transferring at least a portion of the contents 120(2) from the chipset attached memory 108 to the system memory 104 via the chipset link 110. By way of example, the portion of the contents 120(2) includes, but is not limited to, one or more memory addresses associated with respective write requests of the access request(s) 220 serviced by the chipset attached memory 108 while the system memory 104 was offline during the second phase 218 of operation. Said another way, in at least one implementation, the sync instructions 228 include a request for data stored in the chipset attached memory 108 that was modified by the access request(s) 220 or is otherwise not present in the system memory 104. In at least one variation, the sync instructions 228 include instructions for detecting and/or correcting memory corruption (e.g., in the system memory 104) in addition to or as an alternative to instructions for copying data from the chipset attached memory 108 to the system memory 104.

Additionally or alternatively, the sync instructions 228 include instructions for allocating and/or deallocating regions of memory space within the chipset attached memory 108 based on an updated configuration of the system memory 104. When included, memory allocation and/or deallocation instructions are communicated in addition to or as an alternative to the allocation request 216 generated during the first phase 202 of operation. By way of example, the sync instructions 228 include instructions to move data from the second memory region of the system memory 104 to a third memory region of the system memory 104 and/or back to the first memory region of the system memory 104, such as in examples where the second memory region is utilized as a temporary storage location while the system memory 104 is reconfigured. In at least one implementation, the sync instructions 228 reallocate the chipset attached memory 108 in a mirrored manner with respect to the system memory 104.

In response to the sync instructions 228, the chipset attached memory 108 transmits a chipset sync response 230 (e.g., over one or more memory interfaces) to the chipset attached memory controller 116, which communicates the chipset sync response 230 over the chipset link 110 to the memory controller 114 (e.g., of the processing unit package 102), and the memory controller 114 communicates the chipset sync response 230 to the system memory 104 (e.g., over one or more memory interfaces). In this way, data included in the chipset sync response 230 are stored in the system memory 104. In one or more implementations, the memory controller 114 stores the contents included in the chipset sync response 230 to the system memory 104 using one or more write requests. In one or more implementations, the chipset sync response 230 includes all of the contents 120(2) stored in the chipset attached memory 108 or a portion of the contents 120(2), such as those that were modified during the second phase 218 of operation.

The system memory 104 transmits a system sync response 232 to the memory controller 114. In at least one implementation, the system sync response 232 includes an indication that the contents included in the chipset sync response 230 have been stored. In one or more variations, the memory controller 114 further communicates the system sync response 232 to the chipset attached memory controller 116 over the chipset link 110, and the chipset attached memory controller 116 communicates the system sync response 232 to the chipset attached memory 108 (not shown in FIG. 2).

Although not explicitly illustrated in FIG. 2, in at least one implementation, the device (and/or the system 100) resumes the first phase 202 of operation following receipt of the system sync response 232 so that the system memory 104 services the first read request portion 204, the chipset attached memory 108 services the second read request portion 206, and the one or more write requests 212 are serviced by both the system memory 104 and the chipset attached memory 108. Alternatively, the system memory 104 selectively services the read requests, even while the chipset attached memory 108 is online, or the chipset attached memory 108 selectively services the read requests, even while the system memory 104 is online. Furthermore, it is to be appreciated that in at least one variation, the chipset attached memory 108 is shut down, retrained, and/or reset during the second phase 218 of operation rather than the system memory 104, and the system memory 104 services the access request(s) 220 accordingly. In this way, the device is seamlessly transitioned between phases of operation without disruption to the operating system or applications 118, even while either memory location is powered down, reset, and/or retrained, including while physical modules are added and/or removed.

Figure 3:
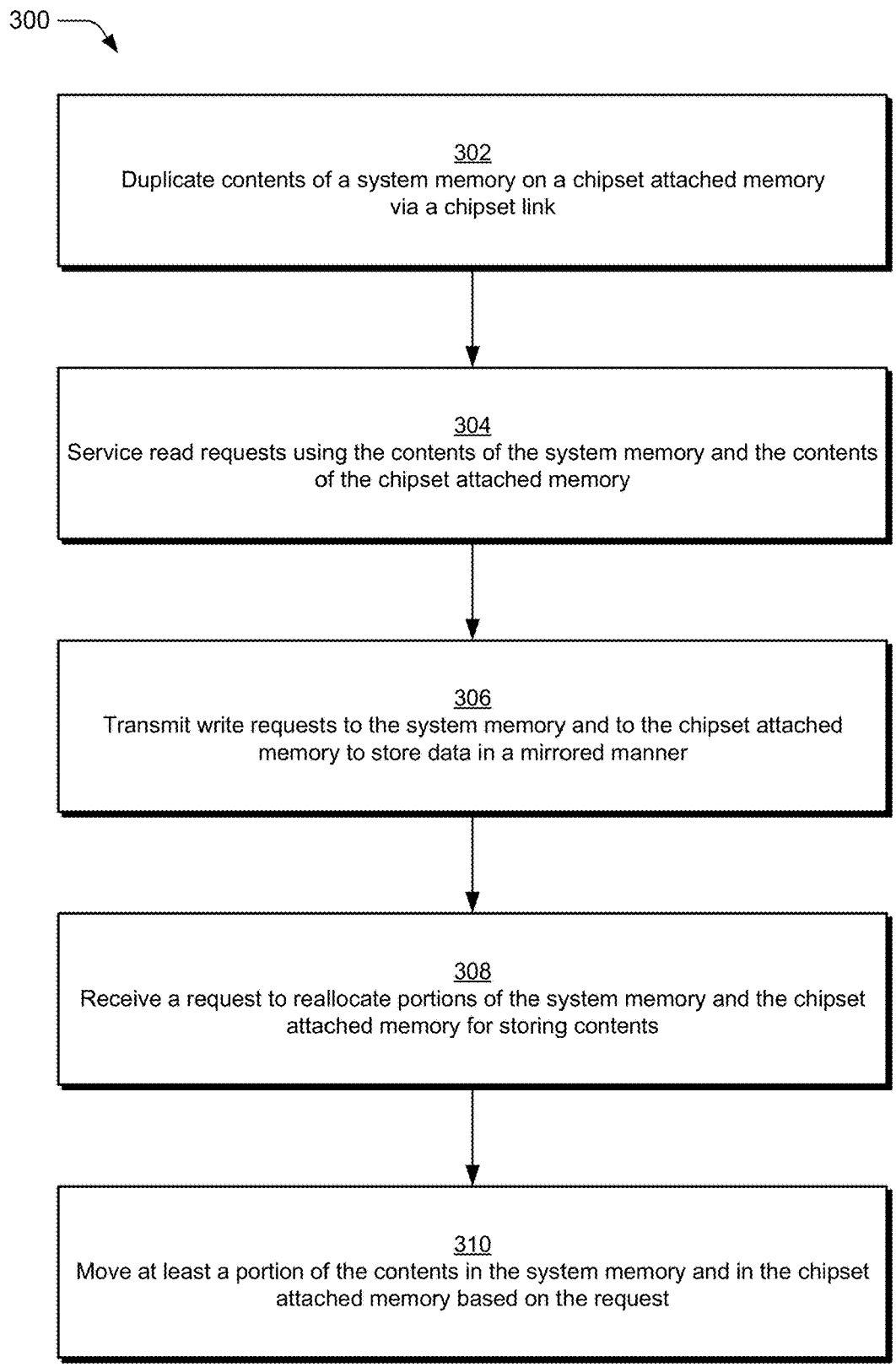
FIG. 3 depicts a procedure in an example implementation of duplicating memory content with chipset attached memory.

FIG. 3 depicts a procedure in an example 300 implementation of duplicating memory content with chipset attached memory.

Contents of a system memory are duplicated on a chipset attached memory via a chipset link (block 302). By way of example, contents 120(1) are obtained from the system memory 104 and duplicated on the chipset attached memory 108 via the chipset link 110. Based on or responsive to receipt of a request for a mirrored memory configuration, for instance, the memory controller 114 causes the contents 120(1) of the system memory 104 to be duplicated to the chipset attached memory 108 via the chipset link 110 so that the chipset attached memory 108 stores the contents 120(2) in a mirrored manner.

Read requests are serviced using the contents of the system memory and the contents of the chipset attached memory (block 304). By way of example, the read requests are serviced by the system memory 104 and the chipset attached memory 108 by reading different portions of the system memory 104 and the chipset attached memory 108 in parallel. For example, a first portion of the read requests (e.g., the first read request portion 204) are transmitted to the system memory 104 from the memory controller 114, and the memory controller 114 receives data of one or more memory addresses associated with the first portion of the read requests from the system memory 104. The memory controller 114 transmits a second, remaining portion of the read requests (e.g., the second read request portion 206) to the chipset attached memory controller 116 via the chipset link 110, and the chipset attached memory controller 116 communicates the second portion of the read requests to the chipset attached memory 108. The chipset attached memory controller 116 receives data of one or more memory addresses associated with the second portion of the read requests from the chipset attached memory 108, and the chipset attached memory controller 116 communicates these data to the memory controller 114. By servicing the read requests using the contents of the system memory 104 and the duplicate contents of the chipset attached memory 108 in parallel, read speeds are increased compared with servicing the read requests via the system memory 104 alone or via the chipset attached memory 108 alone.

Write requests are transmitted to the system memory and to the chipset attached memory to store data in a mirrored manner (block 306). By way of example, the memory controller 114 transmits write requests to the system memory 104 and communicates the same write requests, via the chipset link 110, to the chipset attached memory controller 116, which further communicates the write requests to the chipset attached memory 108. In this way, data is saved to two storage locations (e.g., the system memory 104 and the chipset attached memory 108) during operation in order to maintain system memory redundancy in real-time.

A request is received to reallocate portions of the system memory and the chipset attached memory for storing contents (block 308). By way of example, the memory controller 114 receives the request responsive to user input. Alternatively, the request is received by the memory controller 114 from one or more of the applications 118 (e.g., a memory management application), an operating system, or hardware components of the system 100. In at least one implementation, the request includes instructions for relocating data stored in the system memory and the chipset attached memory, such as to allocate one or more additional portions (e.g., memory regions and/or modules) of the system memory 104 and the chipset attached memory 108 for storing contents and/or to deallocate one or more portions that are currently storing contents. For instance, the one or more portions are deallocated in anticipation of adjustments to the one or more portions, such as physical removal, resetting, and/or retraining of the one or more portions.

At least a portion of the contents in the system memory and in the chipset attached memory is moved based on the request (block 310). By way of example, the memory controller 114 transmits instructions to the system memory 104 to move a portion of the contents 120(1) stored in a first memory region of the system memory 104 to a second memory region of the system memory 104, as specified by the request. Similarly, the memory controller 114 transmits instructions to the chipset attached memory controller 116 over the chipset link 110 to move a portion of the contents 120(2) stored in a first memory region of the chipset attached memory 108 to a second memory region of the chipset attached memory 108, and the chipset attached memory controller 116 communicates the instructions to the chipset attached memory 108. In this way, a mirrored configuration of the system memory 104 and the chipset attached memory 108 is maintained.

Figure 4:
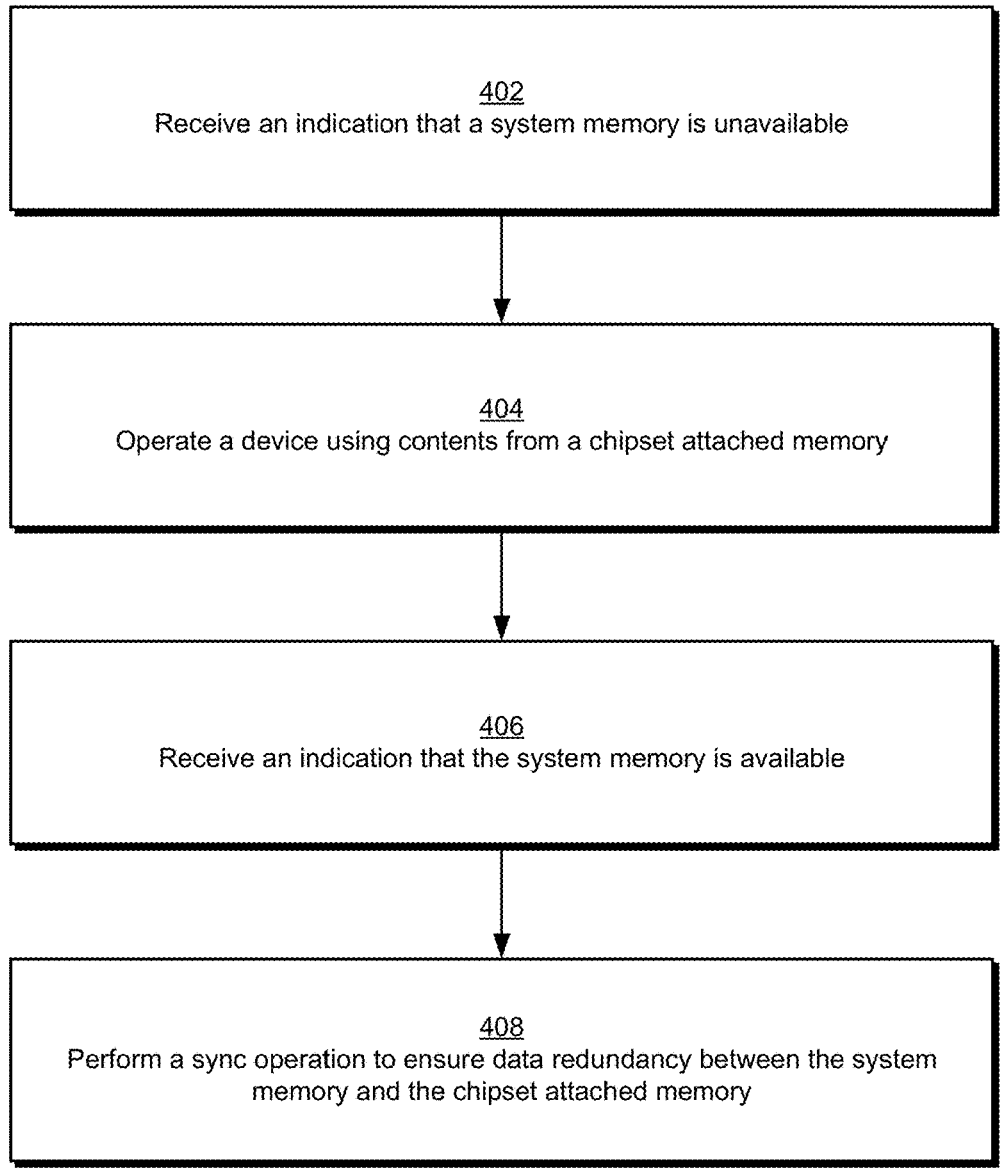
FIG. 4 depicts a procedure in an example implementation of utilizing system memory redundancy with chipset attached memory for device operation.

FIG. 4 depicts a procedure in an example 400 implementation of utilizing system memory redundancy with chipset attached memory for device operation.

An indication that a system memory is unavailable is received (block 402). By way of example, the indication is received by the memory controller 114 in response to user input indicating adjustments (e.g., physical adjustments and/or resetting/retraining) are to be made to the system memory 104. As another example, the indication is received from one or more of the applications 118, an operating system, or hardware components detecting that a physical or communicative connection to the system memory 104 is not present. As yet another example, the indication is received in anticipation of the system memory 104 going offline.

A device is operated using contents from a chipset attached memory (block 404). By way of example, various operations are performed using the contents 120(2) from the chipset attached memory 108. For example, the processing unit 112 executes (and/or seamlessly continues to execute) one or more tasks of an operating system and/or an application (e.g., of the applications 118) using the contents 120(2) from the chipset attached memory 108. Such tasks are performed using the contents 120(2) from the chipset attached memory 108 rather than using the contents 120(1) from the system memory 104. Furthermore, both read and write requests are serviced by the chipset attached memory 108.

An indication that the system memory is available is received (block 406). By way of example, the indication is received by the memory controller 114 in response to user input indicating the adjustments (e.g., the physical adjustments or resetting/retraining) have been completed. As another example, the indication is received from one or more of the applications 118, the operating system, or the hardware components detecting that a physical or communicative connection to the system memory 104 is available.

A sync operation is performed to ensure data redundancy between the system memory and the chipset attached memory (block 408). By way of example, the memory controller 114 communicates the sync instructions 228 to the system memory 104 and to the chipset attached memory controller 116 via the chipset link 110, and the chipset attached memory controller 116 further communicates the sync instructions 228 to the chipset attached memory 108. The sync instructions 228 include, for example, instructions to duplicate at least a portion of the contents 120(2) of the chipset attached memory 108 to the system memory 104, such as data files that are not present in the contents 120(1) of the system memory 104 due to write requests executed while the system memory 104 was unavailable.

Figure 5:
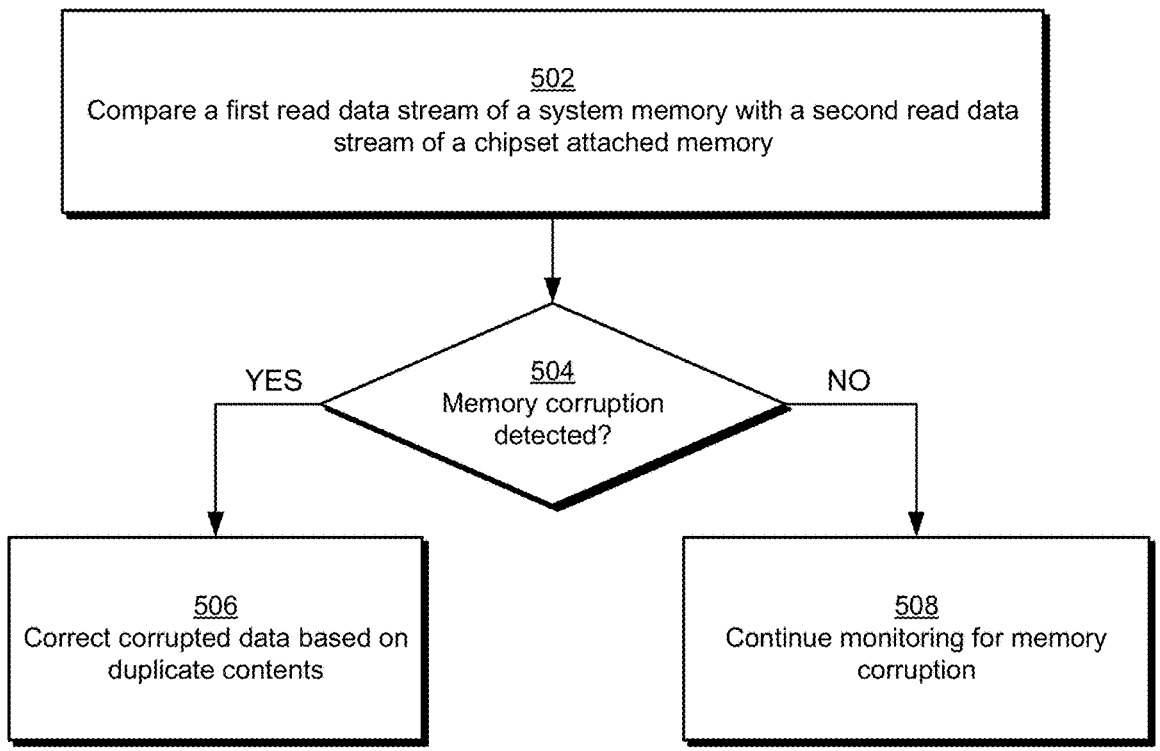
FIG. 5 depicts a procedure in an example implementation of utilizing system memory redundancy with chipset attached memory for memory corruption detection and correction.

FIG. 5 depicts a procedure in an example 500 implementation of utilizing system memory redundancy with chipset attached memory for memory corruption detection and correction.

A first read data stream of a system memory is compared with a second read data stream of a chipset attached memory (block 502). By way of example, the memory controller 114 compares bit values of specific memory addresses of the system memory 104 with bit values of those same memory addresses of the chipset attached memory 108. In at least one implementation, the chipset attached memory 108 has increased error correction and/or data integrity compared with the chipset attached memory 108, and so the bit values of the chipset attached memory 108 are indicated as correct values. In one or more implementations, a portion of the contents 120(1) stored in the system memory 104 and the contents 120(2) stored in the chipset attached memory 108 are read in the first read data stream and the second read data stream, respectively. Alternatively, substantially all of the contents 120(1) and the contents 120(2) are read in the first read data stream and the second read data stream, respectively.

It is to be appreciated that when the system 100 includes multiple separate chipset attached memories, read data streams from those chipset attached memories are also compared. By way of example, a third read data stream of a second chipset attached memory is compared with the first read data stream and the second read data stream, and so forth.

At block 504, it is determined if memory corruption is detected. By way of example, memory corruption is detected in response to at least one bit value of the system memory 104 not matching the corresponding bit value of the chipset attached memory 108. Alternatively, memory corruption is not detected in response to no mismatches (e.g., discrepancies) between the bit values in the first read data stream and the second read data stream.

In response to memory corruption being detected, corrupted data is corrected based on duplicate contents (block 506). By way of example, a mismatched bit value in the contents 120(1) of the system memory 104 is corrected to match the corresponding bit value in the contents 120(2) of the chipset attached memory 108. Additionally or alternatively, the corrupted data is overwritten with corresponding data from the contents 120(2) of the chipset attached memory 108.

In contrast, if memory corruption is not detected, monitoring for memory corruption is continued (block 508). By way of example, the read data streams of the system memory and the chipset attached memory are compared periodically, e.g., at predetermined uniform or variable intervals. Additionally or alternatively, the memory monitoring is performed in response to a trigger, such as an indication that there is memory read bandwidth available that is not being utilized by tasks associated with an operating system and/or the applications 118. In at least one implementation, different portions of the contents are compared during each iteration or memory corruption.

Figure 6:
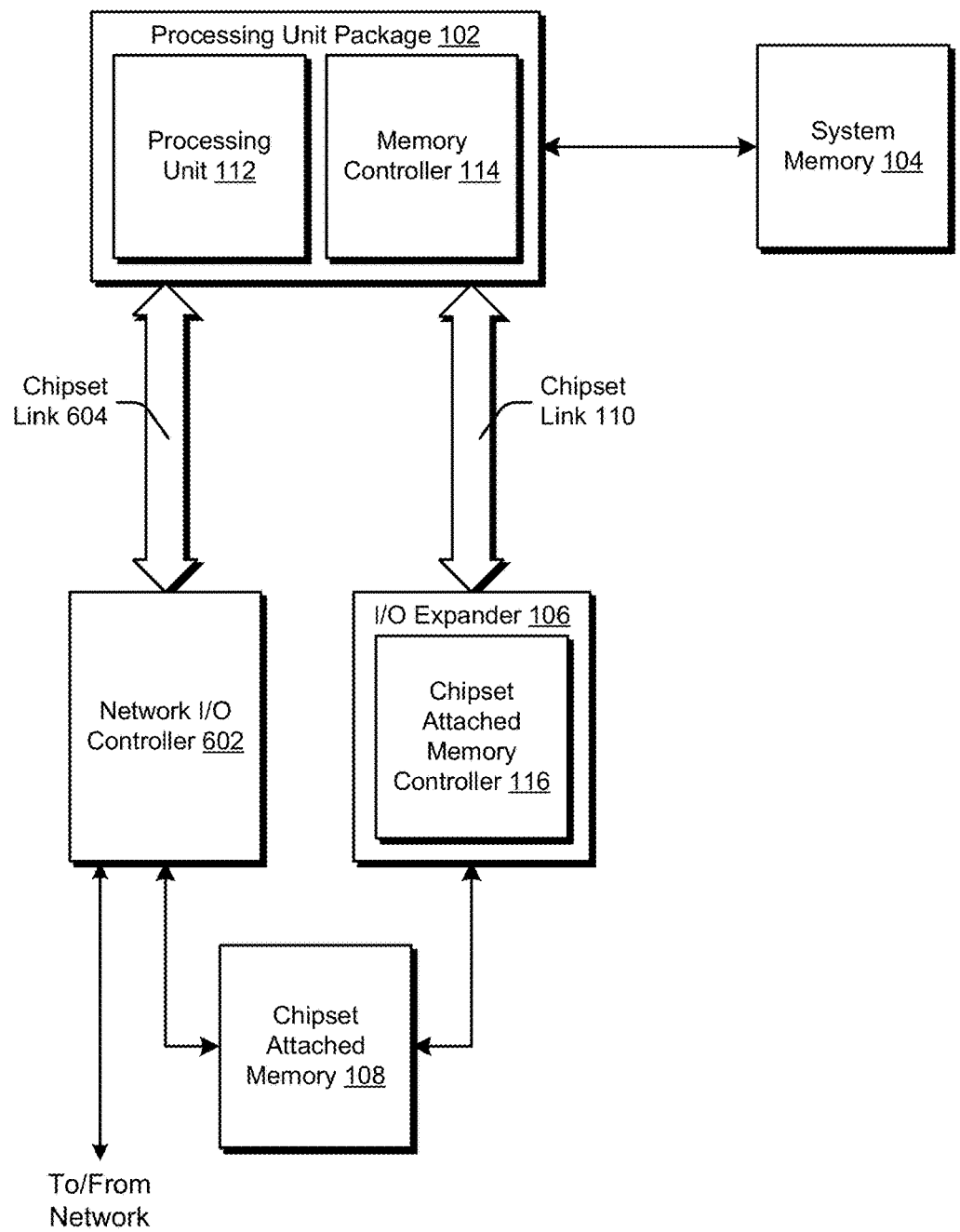
FIG. 6 is an illustration of another non-limiting example system that employs a chipset attached memory for duplicating memory content.

FIG. 6 is an illustration of another non-limiting example system 600 that employs a chipset attached memory for duplicating memory content. The system 600 includes the processing unit package 102, the system memory 104, the I/O expander 106, the chipset attached memory 108, and the chipset link 110 analogous to the system 100 of FIG. 1. The system 600 also includes a network I/O controller 602 and a chipset link 604 allowing the processing unit package 102 to communicate with the network I/O controller 602 using any of a variety of communication links analogous to chipset link 110.

The processing unit package 102, the system memory 104, the I/O expander 106, the chipset attached memory 108, the chipset link 110, the network I/O controller 602, and the chipset link 604 are installed on or are part of, for example, a motherboard or other printed circuit board. In one or more implementations, the I/O expander 106 (including the chipset attached memory controller 116), the chipset link 110, the chipset link 604, one or more memory channels between the processing unit package 102 and the system memory 104, and one or more memory channels between the I/O expander 106 and the chipset attached memory 108 are also referred to as a chipset of a motherboard or other printed circuit board.

The processing unit package 102 includes the processing unit 112 and the memory controller 114. Although a single processing unit 112 is illustrated in the system 600, the processing unit package 102 optionally includes any number of processing units of the same or different types, and or other types of components, such as an artificial intelligence accelerator. Given this architecture, such other optional components also access the system memory 104 directly (e.g., via the memory controller 114) or through an operating system running on the processing unit 112. Those components are also configured to access the chipset attached memory 108 (e.g., via the I/O expander 106 or the network I/O controller 602).

The network I/O controller 602 manages communication over a network, such as by sending data or control signals to one or more other devices via the network and receiving data or control signals from one or more other devices via the network. The network is implemented in any of a variety of manners, such as an Ethernet network, an InfiniBand network, and so forth. The network I/O controller 602 is also coupled or attached to the chipset attached memory 108 via one or more memory channels. In one or more implementations, the chipset attached memory 108 is address space (e.g., PCIe address space) that is addressable by other server nodes as well as components of the system 600 (e.g., the processing unit 112). The network I/O controller 602 is thus able to send read and write requests to the chipset attached memory 108 and receive responses from the chipset attached memory 108, analogous to the chipset attached memory controller 116.

In one or more implementations, the chipset attached memory 108 is attached or coupled to only one of the network I/O controller 602 or the I/O expander 106 rather than attached or coupled to both the network I/O controller 602 and the I/O expander 106.

The network I/O controller 602 being attached or coupled to the chipset attached memory 108 supports various different usage scenarios. In one or more implementations, the processing unit package 102 is able to access the chipset attached memory 108 via the network I/O controller 602, allowing the chipset attached memory 108 to be used in situations where the chipset attached memory 108 is not attached or coupled to the I/O expander 106. Such situations arise, for example, where board routing limitations prevent the chipset attached memory 108 from being attached or coupled to the I/O expander 106.

In one or more implementations, the network I/O controller 602 allows the chipset attached memory 108 to be accessed by other devices via the network. This access is allowed using any of a variety of public or proprietary remote direct memory access (RDMA) techniques. For example, assume the system 600 is implemented in a server node connected to multiple other server nodes (e.g., some including their own chipset attached memory and optionally others not including their own chipset attached memory). Another server node communicates read and write requests to the chipset attached memory 108 via the network I/O controller 602 and receives responses from the chipset attached memory 108 via the network I/O controller 602. The other server node is thus able to make use of the chipset attached memory 108 without disrupting the system memory 104 or even the processing unit package 102. E.g., the processing unit package 102 need not have knowledge of the other server node accessing the chipset attached memory 108.

By way of another example, assume the system 600 is implemented in a server node connected to multiple other server nodes, at least one of which includes its own chipset attached memory. In at least one variation, the processing unit 112 (or other component of the processing unit package 102) is able to communicate read and write requests to the chipset attached memory of the other server node via the network I/O controller 602 and receive responses from the chipset attached memory of the other server node via the network I/O controller 602. The processing unit 112 or other component of the processing unit package 102 is thus able to make use of the chipset attached memory of another sever node without disrupting the system memory 104 or the chipset attached memory 108.

Figure 7:
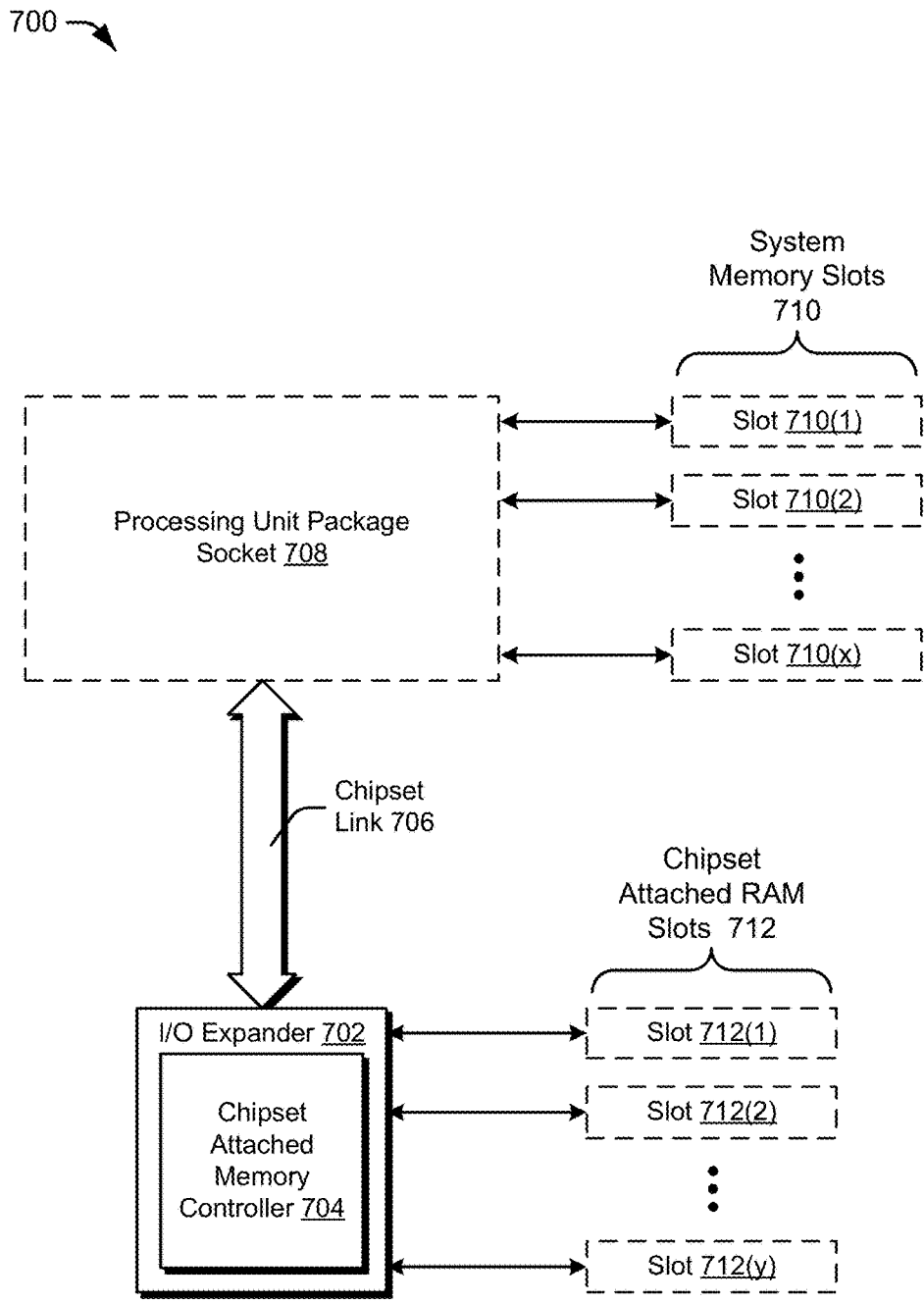
FIG. 7 is an illustration of another non-limiting example system that employs a chipset attached memory for duplicating memory content.

FIG. 7 is an illustration of another non-limiting example system 700 that employs a chipset attached memory for duplicating memory content. The system 700 is, for example, a motherboard or other printed circuit board. The system 700 includes an I/O expander 702 that includes a chipset attached memory controller 704 and a chipset link 706. The system 700 also includes a processing unit package socket 708, system memory slots 710, and chipset attached memory slots 712. The processing unit package socket 708 is designed to have a processing unit package, such as the processing unit package 102 of FIG. 1 or FIG. 6, installed or inserted therein. In one or more implementations, the I/O expander 702 (including the chipset attached memory controller 704), the chipset link 706, one or more memory channels between the processing unit package socket 708 and the system memory slots 710, and one or more memory channels between the I/O expander 702 and the chipset attached memory slots 712 are also referred to as a chipset of a motherboard or other printed circuit board.

The I/O expander 702 is an I/O expander analogous to the I/O expander 106 of FIG. 1 or FIG. 6. The chipset attached memory controller 704 is a chipset attached memory controller analogous to the chipset attached memory controller 116 of FIG. 1 or FIG. 6. The chipset link 706 is analogous to the chipset link 110 of FIG. 1 or FIG. 4.

The system memory slots 710 include multiple ("x") memory slots 710(1), 710(2), . . . , 710(x). The system memory slots 710 are designed to have system memory, such as the system memory 104 of FIG. 1 or FIG. 6, installed or inserted therein. The system memory slots 710 are, for example, DIMM, SO-DIMM, or RDIMM slots. Although multiple memory slots 710(1), 710(2), . . . , 710(x) are illustrated, the system 700 optionally includes a single memory slot 710 or any other number of memory slots 710.

The chipset attached memory slots 712 include multiple ("y") slots 712(1), 712(2), . . . , 712(y). The chipset attached memory slots 712 are designed to have chipset attached memory, such as the chipset attached memory 108 of FIG. 1 or FIG. 6, installed or inserted therein. The chipset attached memory slots 712 are, for example, DIMM, SO-DIMM, or RDIMM slots. Although multiple memory slots 712(1), 712(2), . . . , 712(y) are illustrated, the system 700 optionally includes a single memory slot 712 or any other number of memory slots 712.

With a processing unit package installed or inserted in the processing unit package socket 708, system memory installed or inserted in the system memory slots 710, chipset attached memory installed or inserted in the chipset attached memory slots 712, and additional I/O devices (e.g., a chipset attached nonvolatile memory and/or a chipset attached disk drive) optionally installed or otherwise coupled to the I/O expander 702, the system 700 becomes the system 100 of FIG. 1 or a system having tiered memory options.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the processing unit package 102, the system memory 104, the chipset attached memory 108, the chipset link 110, the processing unit 112, the memory controller 114, and the chipset attached memory controller 116) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. An apparatus comprising:
 a system memory attached to a first memory controller;
 a chipset attached memory connected to the system memory via a southbridge; and
 a second memory controller attached to the chipset attached memory to:
  obtain contents of the system memory;
  duplicate the contents of the system memory on the chipset attached memory over a chipset link; and
  service memory requests using the contents of the system memory and the contents on the chipset attached memory in parallel.

2. The apparatus of claim 1, wherein to service the memory requests using the contents of the system memory and the contents on the chipset attached memory, the second memory controller is further configured to:
 service a first portion of a read request using the contents of the system memory; and
 service a second, remaining portion of the read request using the contents of the chipset attached memory.

3. The apparatus of claim 1, wherein to service the memory requests using the contents of the system memory and the contents on the chipset attached memory, the second memory controller is further configured to communicate a write request to the system memory and to the chipset attached memory.

4. The apparatus of claim 1, wherein the second memory controller duplicates the contents of the system memory on the chipset attached memory over the chipset link in response to receiving a request for a mirrored memory configuration.

5. The apparatus of claim 1, wherein the second memory controller is further configured to dynamically allocate and deallocate portions of the system memory and the chipset attached memory for storing the contents.

6. The apparatus of claim 5, wherein the second memory controller is configured to dynamically allocate and deallocate the portions of the system memory and the chipset attached memory for storing the contents in response to receiving an indication of at least one of a physical adjustment to the system memory or the chipset attached memory, a retraining of the system memory or the chipset attached memory, and a resetting of the system memory or the chipset attached memory.

7. The apparatus of claim 1, further comprising a processing unit, and wherein the memory requests are received by the second memory controller from one or more applications executing on the processing unit.

8. The apparatus of claim 7, wherein the processing unit is configured to execute one or more tasks of an operating system or the one or more applications using the contents on the chipset attached memory while the system memory is unavailable.

9. The apparatus of claim 1, wherein the second memory controller is further configured to identify corrupted data in the system memory based on discrepancies between a first read data stream from a memory section of the system memory and a second read data stream from a corresponding memory section of the chipset attached memory.

10. The apparatus of claim 9, wherein the second memory controller is further configured to correct the corrupted data by writing data from the corresponding memory section of the chipset attached memory to the memory section of the system memory.

11. The apparatus of claim 1, wherein the system memory comprises a type of random-access memory (RAM).

12. The apparatus of claim 1, wherein the chipset attached memory comprises dynamic random-access memory (DRAM) or non-volatile random-access memory (NVRAM).

13. A method comprising:
obtaining contents of a system memory attached to a first memory controller;
writing duplicate contents of the system memory to a chipset attached memory that is attached to a second memory controller and is connected to the system memory via a southbridge;
servicing read requests, received from one or more applications, using the contents of the system memory and the duplicate contents of the chipset attached memory in parallel; and
storing write requests to the contents of the system memory and to the duplicate contents of the chipset attached memory.

14. The method of claim 13, wherein the writing the duplicate contents of the system memory to the chipset attached memory is performed over a chipset link in response to a request for a mirrored memory configuration.

15. The method of claim 13, further comprising dynamically allocating and deallocating portions of the system memory and the chipset attached memory for storing the contents and the duplicate contents, respectively.

16. The method of claim 13, wherein the servicing the read requests, received from the one or more applications, using the contents of the system memory and the duplicate contents of the chipset attached memory in parallel comprises:
servicing a first portion of the read requests using the contents of the system memory; and
while servicing the first portion of the read requests using the contents of the system memory, servicing a second, remaining portion of the read requests using the duplicate contents of the chipset attached memory.

17. The method of claim 13, further comprising:
executing, via a processing unit, one or more tasks of an operating system or an application using the duplicate contents of the chipset attached memory in response to an indication that the system memory is unavailable.

18. A system comprising:
a system memory attached to a first memory controller and configured to store contents;
a chipset attached memory attached to a second memory controller and connected to the system memory via a southbridge to store the contents of the system memory in a mirrored manner; and
a processing unit to:
execute one or more tasks of an operating system using the contents of the system memory in response to a first indication that the system memory is available for servicing memory requests; and
continue executing the one or more tasks using the contents of the chipset attached memory in response to a second indication that the system memory is not available for servicing the memory requests.

19. The system of claim 18, further comprising a chipset link, and wherein the chipset attached memory is separate from the system memory and communicates with the processing unit via the chipset link.

20. The system of claim 18, wherein the second memory controller is configured to:
in response to the first indication that the system memory is available for servicing the memory requests:
communicate a first portion of a read request to the system memory and a second portion of the read request to the chipset attached memory over a chipset link; and
communicate a write request to the system memory and to the chipset attached memory over the chipset link; and
in response to the second indication that the system memory is not available for servicing the memory requests:
communicate the first portion and the second portion of the read request to the chipset attached memory over the chipset link; and
communicate the write request to the chipset attached memory over the chipset link.

* * * * *